(12) United States Patent
Sambotin et al.

(10) Patent No.: US 8,074,288 B2
(45) Date of Patent: Dec. 6, 2011

(54) ISOLATION OF APPLICATION-SPECIFIC DATA WITHIN A USER ACCOUNT

(75) Inventors: Dragos Sambotin, Issaquah, WA (US); Karthik Thirumalai, Redmond, WA (US); Richard B Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1333 days.

(21) Appl. No.: 11/274,023

(22) Filed: Nov. 15, 2005

(65) Prior Publication Data

US 2007/0033638 A1 Feb. 8, 2007

Related U.S. Application Data

(60) Provisional application No. 60/699,963, filed on Jul. 15, 2005.

(51) Int. Cl.
*G06F 12/14* (2006.01)
*G06F 17/30* (2006.01)
*G06F 7/04* (2006.01)

(52) U.S. Cl. ............ 726/30; 726/21; 713/164; 713/165; 713/166; 713/167; 713/193

(58) Field of Classification Search ............... 726/21, 726/30; 713/193, 164–167
See application file for complete search history.

(56) References Cited

U.S. PATENT DOCUMENTS

| | | | | |
|---|---|---|---|---|
| 5,251,317 A * | 10/1993 | Iizuka et al. | ................... | 718/104 |
| 5,842,015 A * | 11/1998 | Cunniff et al. | ................ | 718/104 |
| 6,085,030 A * | 7/2000 | Whitehead et al. | ........... | 709/203 |
| 6,148,336 A * | 11/2000 | Thomas et al. | ................ | 709/224 |
| 6,296,191 B1 * | 10/2001 | Hamann et al. | ................ | 235/492 |
| 6,374,284 B1 * | 4/2002 | Tadokoro | ....................... | 718/102 |
| 6,513,107 B1 * | 1/2003 | Ansari | ............................... | 712/4 |
| 6,651,123 B1 * | 11/2003 | Hutchison et al. | ............. | 710/200 |
| 6,810,521 B1 * | 10/2004 | Gelgon et al. | ................. | 719/313 |
| 7,257,815 B2 * | 8/2007 | Gbadegesin et al. | ......... | 718/104 |
| 7,281,101 B2 * | 10/2007 | Mizushima et al. | .......... | 711/163 |
| 7,379,948 B2 * | 5/2008 | Gray et al. | ............................ | 1/1 |
| 7,461,148 B1 * | 12/2008 | Beloussov et al. | ............ | 709/226 |
| 7,555,483 B2 * | 6/2009 | Maeda et al. | .......................... | 1/1 |
| 7,620,731 B1 * | 11/2009 | Dasan et al. | ..................... | 709/239 |
| 7,853,947 B2 * | 12/2010 | Laborczfalvi et al. | ........... | 718/1 |
| 2002/0002673 A1* | 1/2002 | Narin | ............................. | 713/152 |
| 2002/0066021 A1* | 5/2002 | Chien et al. | .................... | 713/200 |
| 2002/0091867 A1* | 7/2002 | Reid | ............................. | 709/310 |
| 2002/0172363 A1* | 11/2002 | Dierks et al. | .................... | 380/259 |
| 2003/0061504 A1* | 3/2003 | Sprigg et al. | .................. | 713/200 |
| 2003/0084256 A1* | 5/2003 | McKee | ........................ | 711/152 |
| 2003/0115476 A1* | 6/2003 | McKee | ........................ | 713/193 |
| 2003/0118188 A1* | 6/2003 | Collier et al. | .................. | 380/277 |
| 2003/0192059 A1* | 10/2003 | Soloff et al. | .................... | 725/131 |
| 2003/0233644 A1* | 12/2003 | Cohen et al. | .................. | 717/171 |
| 2004/0088340 A1* | 5/2004 | Idicula et al. | ................. | 707/206 |
| 2004/0107199 A1* | 6/2004 | Dalrymple et al. | ........... | 707/100 |

(Continued)

*Primary Examiner* — Michael Pyzocha (57) ABSTRACT

A mechanism is provided for isolating application-specific data in an environment where multiple applications share a same user account. This mechanism enables data specific to an application to be accessed only by the application. When an application requests application-specific data, the data is loaded and a handle to the data is returned to the application. Access to the data is allowed only though the handle. Therefore, only the application possessing the handle can access the data. A counter may be associated with the loaded data. The counter's value is incremented whenever a handle is created for the data and decremented whenever a handle for the data is terminated. When the value of the counter reaches zero, the data is automatically unloaded.

14 Claims, 4 Drawing Sheets

U.S. PATENT DOCUMENTS

| | | | |
|---|---|---|---|
| 2004/0162807 A1* | 8/2004 | Montagne | 707/1 |
| 2004/0267804 A1* | 12/2004 | Fresko et al. | 707/102 |
| 2005/0005079 A1* | 1/2005 | Boudou et al. | 711/156 |
| 2005/0081204 A1* | 4/2005 | Schopp | 718/100 |
| 2005/0114870 A1* | 5/2005 | Song et al. | 719/328 |
| 2006/0004805 A1* | 1/2006 | Grunkemeyer et al. | 707/101 |
| 2006/0184942 A1* | 8/2006 | Cox | 718/100 |
| 2007/0083726 A1* | 4/2007 | Newton et al. | 711/170 |

* cited by examiner

ISOLATION OF APPLICATION-SPECIFIC DATA WITHIN A USER ACCOUNT

CROSS-REFERENCE TO RELATED APPLICATION

This application claims the benefit of U.S. Provisional Patent Application Ser. No. 60/699,963, filed on Jul. 15, 2005, titled "ISOLATION OF APPLICATION HAVING SPECIFIC DATA WITHIN A USER ACCOUNT," the disclosure of which is hereby expressly incorporated by reference, and the filing date of which is hereby claimed under 35 U.S.C. §119(e).

BACKGROUND

Conventionally, an operating system isolates application-specific data at the granularity of user accounts. That is, applications running with different user accounts are isolated from each other. As a result, an application running with a user account cannot access data for the same application running with another user account. However, data for applications executing with the same user account are not isolated from each other. As a result, an application executing with a user account can access and even modify data for another application executing with the same user account. This can cause potential stability, security and management problems. Therefore, it is desirable to provide a mechanism to separate application-specific data among applications sharing a same user account.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention enables data specific to an application to be isolated from other applications in an environment where multiple applications are associated with a same user account. For example, the invention employs a handle-based approach for accessing data. An application can access the data if the application possesses a handle to the data. If the data is application-specific, only one handle can be created for the data. The handle is passed to the application that the data is identified with. Only the application possessing the handle can access the data. Access requests from other applications sharing the same user account with the application are denied.

According to one aspect of the invention, when an application needs to access data and the data has not been loaded, the data is first loaded. Preferably, a unique identifier is generated for the data. The unique identifier then is used to form an access path for the data. The access path indicates a location to which that the data can be loaded. The data is loaded at the location. A handle is created for the loaded data and passed to the application. The application can access the data through the handle. If only the application can access the data, the data is regarded as application-specific. No other applications sharing the same user account with the application are able to create handles to the loaded data or access the data through the handle. On the other hand, if the data is not application-specific, other applications can create handles to the data and access the data through the handles.

In accordance with another aspect of the invention, a counter is created for the data when the data are loaded. The value of the counter is incremented whenever a handle is created for the data and decremented whenever a handle for the data is terminated. The data is automatically unloaded when the value of the counter reaches zero.

In accordance with a further aspect of the invention, an application programming interface is provided for applications-specific data access. The application programming interface includes a function that, in an environment where multiple applications share a same user account, provides access to a data object upon receiving an access request from a computing process, i.e., an application. The faction can be configured so that the data object can only be accessed by the computing process requesting the access. That is, other computing processes cannot access the data object. Preferably, the function includes a parameter that can be configured so only the computing process currently calling the function can access the data object. The parameter can also be configured so that any computing process calling the function to access the data object is able to access the data object.

More specifically, upon being called by a computing process requesting access to a data object, the function creates a unique identifier for the data object. The unique identifier can then be used to generate a path indicating a location to load the data object. The function then loads the data object accordingly. The function then returns to the computing process a handle to the loaded data object. Whenever the computing process completes the access request, the corresponding handle is terminated. When there is no handle associated with the data object, the function unloads the data object.

In summary, the invention prevents data specific to an application being accessed by other applications that share a same user account with the application. The invention enables data specific to an application to be accessed only by the application. Thus, other applications sharing the same user account with the application cannot interference with integrity of the application-specific data.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the invention separate application-specific data between applications associated with a same user account. More specifically, embodiments of the invention adopt a handle-based approach for accessing data in an environment where multiple applications are associated with the same user account. When an application needs to access data that is specific to the application, the data is loaded; a handle is created for the data and passed to the application. The application accesses the data through the handle. Other applications can not create handles for the data and hence are denied access to the data. In embodiments of the invention, the data may include any data that can be used by the applications sharing the same user account.

Figure 1:
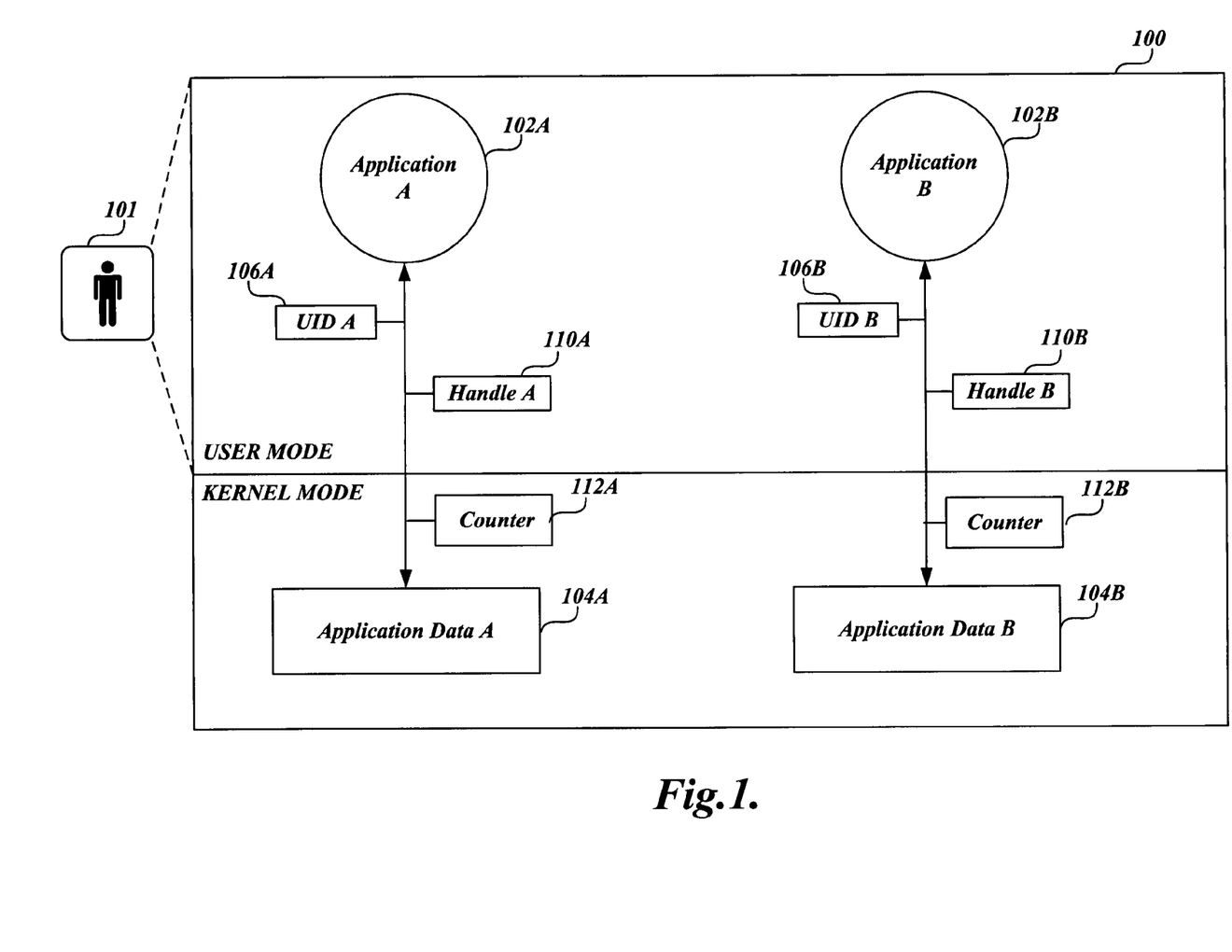
FIG. 1 is a block diagram illustrating an exemplary computing system for implementing aspects of the invention, wherein application-specific data for multiple applications with the same user account are separated.

FIG. 1 illustrates a computing system 100 hosting multiple applications for a user 101. The multiple applications include Application A (102A) and Application B (102B). In this illustrated example, Application Data A (104A) is specific to Application A (102A) while Application Data B (104B) is specific to Application B (102B). In embodiments of the invention, upon receiving an access request from an application for a data object specific to the application, a unique identifier ("UID") is dynamically generated. The UID is used to generate an access path for the data object. For example, once Application A (102A) requests Application Data A (104A), a UID A (106A) is dynamically generated. The UID A (106A) is then used to generate an access path such as /root/app/UID A/Application Data A, which can be used for loading Application Data A (104A) to the location specified by the access path. Similarly, when Application B (102B) wants to access Application Data B (104B), the computing system 100 dynamically generates a UID B (106B), which is used to form an access path for Application Data B (104B). Such an access path can be, e.g., /root/app/UID B/Application Data B. Application Data B (104B) can be loaded to the location specified by the access path.

In embodiments of the invention, after generating a UID and a corresponding access path for the application-specific data object, the computing system 100 loads the data object at the location specified by the access path. The computing system 100 then creates a handle to the loaded data object and passes the handle to the application requesting the data object. For example, as shown in FIG. 1, Application A (102A) receives a Handle A (10A) to the Application Data A (104A); and Application B (102B) receives a Handle B (10B) to Application Data B (104B). In embodiments of the invention, only the application possessing a handle to a data object can access the data object and only the application that a data object is specifically identified with can possess a handle to the data object. Therefore, in the example illustrated in FIG. 1, only Application A (102A) can access Application Data A (104A); and only Application B (102B) can access Application Data B (104B).

Theoretically, other applications can access a data object through its access path. In embodiments of the invention, if an application attempts to access a data object through its access path, such access will be denied. For example, as noted above, the access path for Application Data A (104A) is /root/app/UID A/Application Data A. Theoretically, Application B (102B) can access Application Data A (104A) through this access path. Embodiments of the invention deny such an access and only allow access to Application Data A(104A) through the Handle A (110A). Thus, only Application A (102A) can access Application Data A (A104).

Embodiments of the invention also provide a counter for a loaded data object. Whenever a handle is created for the loaded data object, the value of the counter is incremented. Whenever a handle to the loaded data object is terminated, the value of the counter is decremented. In embodiments of the invention, when the value of the counter reaches zero, the corresponding data object is unloaded. For example, as shown in FIG. 1, the loaded Application Data A (104A) is associated with a Counter 112A, and the loaded Application Data B (104B) is associated with a Counter 112B. In embodiments of the invention, when a data object is loaded, another application cannot replace the loaded data object with another data object.

In an exemplary embodiment of the invention, the computing system 100 uses a Microsoft® Windows® operating system. As known by those of ordinary skill in the art, Microsoft® Windows® operating system uses a Windows® registry as the central repository for system- and user-related data. On disk, the Windows® registry is organized as a set of discrete files, data objects, called hives. Each hive contains a hierarchy of data. When a hive is loaded into the file system of a computer system, the access path to the hive is recorded under the HKEY_LOCAL_MACHINE/SYSTEM/CurrentControlSet/Control/hivelist. The access path is removed if the hive is unloaded.

Currently, when a Microsoft® Windows® operating system starts, the Windows® registry loads certain hives by default. Conventionally, a RegLoadKey API has been used that allows users to load specific hives on demand. When a hive is loaded using the RegLoadKey API, the hive is visible system wide. As a result, data in the hive can be accessed by anyone with sufficient access rights. However, the RegLoadKey API does not enable normal users to load hives without requiring special privileges. The RegLoadKey API also does not prevent other applications running with the same user account from manipulating data in the hive.

To address the limitations posed by the RegLoadKey API, an exemplary embodiment of the invention provides a new hive load API named, for example, RegLoadAppKey. The RegLoadAppKey API allows a user to load hives without requiring special privileges. The RegLoadAppKey API also allows for application-level isolation of hives loaded using this API. Unlike the existing RegLoadKey API that loads hives with system-wide visibility, the RegLoadAppKey API loads hives with only process-wide visibility. That is, only a process calling the RegLoadAppKey API will get a handle to the hive. The RegLoadAppKey API exposes a hive to only the first process that successfully loads the hive. Thus, using the RegLoadAppKey API, an application can load a hive that contains settings relevant only to the application and be guaranteed that no other applications running under the same or a different user account can access this hive. On termination of the application, or when the last reference to the handle associated with the hive is closed, the hive is automatically unloaded.

Figure 2:
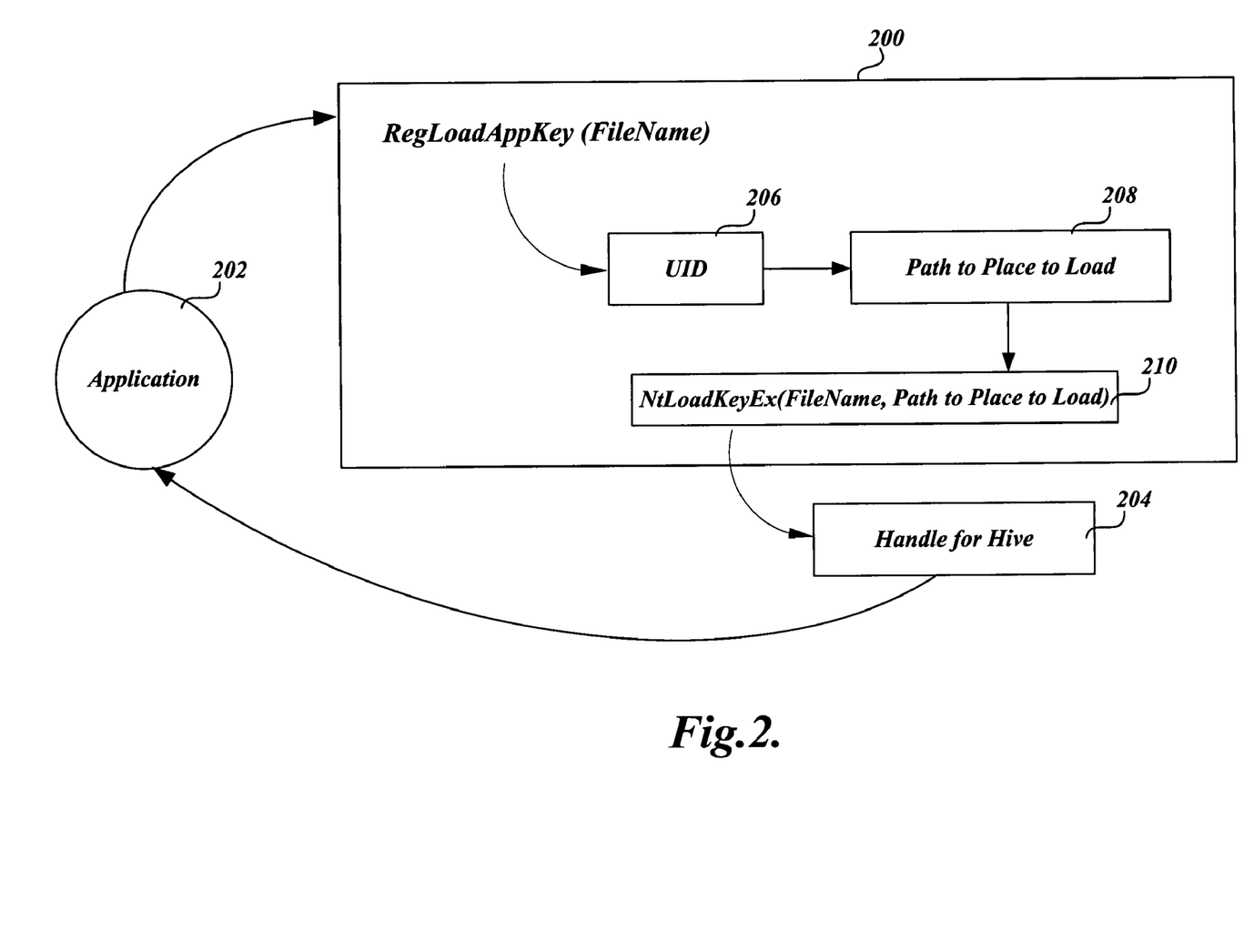
FIG. 2 is a block diagram illustrating an exemplary Windows® API for implementing aspects of the invention.

FIG. 2 illustrates an exemplary usage of the RegLoadAppKey API 200. When an application 202 calls the RegLoadAppKey API 200 to load a specific hive, the application 202 provides the RegLoadAppKey API 200 with the file name of the hive to be loaded. The RegLoadAppKey API 200 loads the specified hive according to the provided file name and provides a handle 204 for the hive back to the application 202. The application 202 can then operate on the loaded hive through the handle 204.

In an exemplary implementation of the RegLoadAppKey API 200, upon receiving the file name of the hive to be loaded, the RegLoadAppKey API 200 generates a UID 206. If the hive has already been loaded, the UID 206 is ignored. Otherwise, the UID 206 is used to form a "path to place to load" 208, which indicates a location that the hive can be loaded to. For example, the hive may be loaded to /registry/app/UID.

In the exemplary embodiment of the invention, the RegLoadAppKey 200 then may call an NtLoadKeyEx API 210 to load the hive. The NtLoadKeyEx API 210 loads the hive to the location specified by "path to place to load" 208 and returns a handle 204 for the hive. Preferably, whenever the application 202 calls the RegLoadAppKey API 200 to access the hive, a handle for the hive 204 is created. When the application 202 relinquishes an access, the corresponding handle is closed. When all handles for the hive are closed, the hive is automatically unloaded.

Operationally, the RegLoadAppKey API 200 may include a parameter for specifying that access to the hive is limited to the calling application 202. When the parameter is specified, subsequent attempts by other applications to load the same hive will fail, thus making the hive accessible only to the application 202 that loaded it. If the parameter is not specified, multiple applications, i.e., processes, can load the same hive. Furthermore, the RegLoadAppKey API 200 denies an access request if such an access request attempts to access the hive through the "path to place to load" 208, instead from the handle 204 for the hive.

Figure 3A:
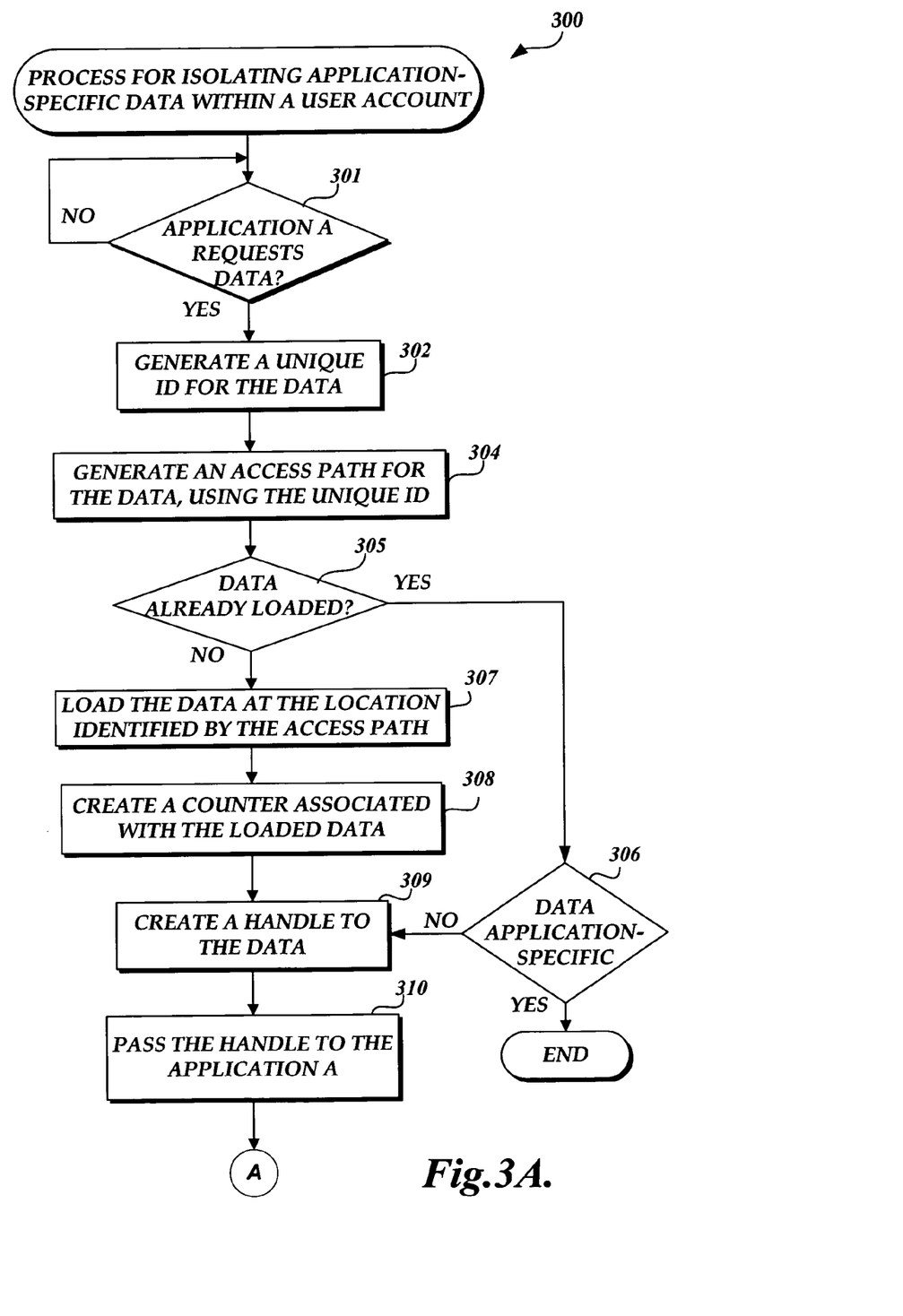
FIGS. 3A-3B are flow diagrams illustrating an exemplary process for isolating application-specific data within a user account.
Figure 3B:
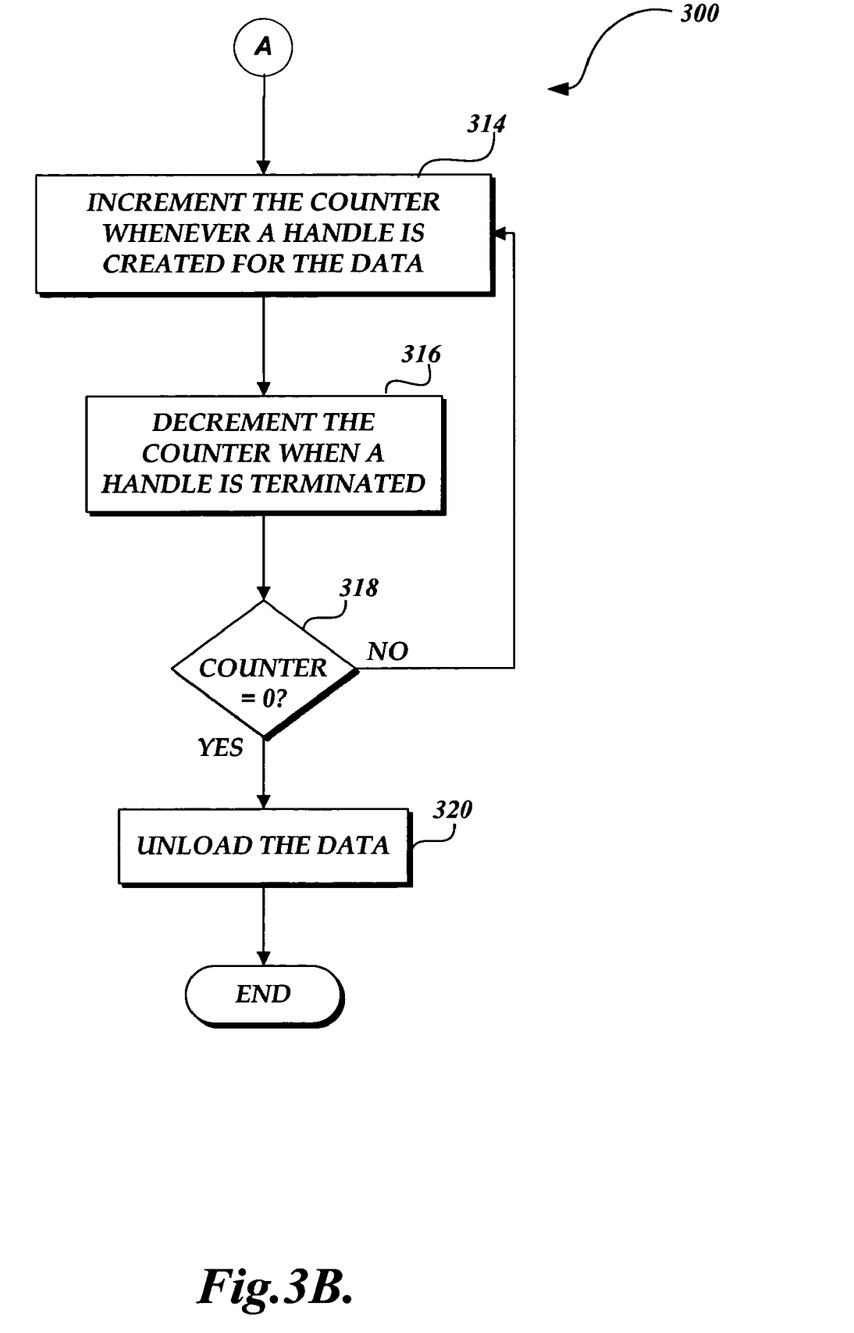

FIGS. 3A and 3B illustrate an exemplary process 300 for isolating data specific to an application from other applications sharing a same user account with the application. In essence, the process 300 loads the requested data if the data are unloaded, creates a handle to the loaded data, and passes the handle to the application requesting the data. The process 300 also uses a counter to keep track of the number of handles associated with the data. The value of the counter is incremented whenever a handle is created for the data and decremented whenever the application terminates the handle associated with the data. When the value of the counter reaches zero, the data is automatically unloaded. In particular, an application may load the data with the specification that no other applications can access data. In such a case, access request from another application will be denied.

Specifically, as shown in FIG. 3A, the process 300 is initiated when an application A requests to access certain data. See decision block 301. In exemplary embodiments of the invention, upon receiving such a request, the process 300 generates a unique identifier for the data. See block 302. The process 300 then generates an access path for the data, using the unique identifier. See block 304. For example, as noted above, the access path for Application Data A (104A) that has the UID A (106A) is /Root/App/UIDA/ApplicationDataA.

The process 300 then proceeds to determine whether the data has already been loaded by another application. See decision block 305. If the answer to decision block 305 is YES, the process 300 proceeds to determine whether the loaded data is application-specific, i.e., only the application that has loaded the data can access the data. See decision block 306. If the answer to the decision block 306 is YES, meaning that the data is application-specific and has been loaded by another application, the process 300 terminates. The access request from application A is denied.

If the answer to decision block 306 is NO, meaning that the data can be accessed by multiple applications, the process 300 proceeds to create a handle to the loaded data. See block 308.

On the other hand, if the answer to decision block 305 is NO, meaning the data has not been loaded by any application, the process 300 loads the data at the location identified by the generated access path. See block 307. The process 300 then creates a counter associated with the loaded data. See block 308. The counter's initial value is set to be zero. The process 300 then creates a handle to the data. See block 309. The process 300 passes the handle to the application. See block 310. From block 310, the process 300 precedes to a continuation terminal A.

In embodiments of the invention, if the data is application-specific, only one handle is created for the data and only the application possessing the handle can access the data. Other applications, because they do not have a handle to the data, cannot access the data. As noted above, theoretically, other applications can access the data through the generated access path. However, embodiments of the invention deny access to the data through the access path. Therefore, only an application possessing a handle to the data can access the data.

In embodiments of the invention, the counter is used to keep track of how many handles are associated with the loaded data. The value of the counter is incremented whenever a handle is created for the loaded data, and decremented whenever a handle to the data is terminated. The data is automatically unloaded when the value of the counter reaches zero. As a result, as illustrated in FIG. 3B, from the continuation terminal A, the counter is incremented when a handle is created for the data. See block 314. In addition, the value of the counter is decremented when a handle to the data is terminated. See block 316. In embodiments of the invention, the process 300 periodically checks the value of the counter to determine if it has reached zero. See decision block 318. When the value of the counter reaches zero, meaning no handle is associated with the data, the process 300 unloads the data. See block 320. If the answer to decision block 318 is NO, meaning that the value of the counter is not zero, the process 300 loops back to block 314 to wait for any adjustment in the value of the counter. Once the data is unloaded, the process 300 terminates.

Consequently, embodiments of the invention isolate application-specific data running under the same user account. Embodiments of the invention also automatically unload a data object once the last reference to the data object is closed.

While illustrative embodiments of the invention have been illustrated and described, it will be appreciated that various changes can be made therein without departing from the spirit and scope of the invention.

The invention claimed is:

1. In a computing system associating multiple applications with a same user account, a method for isolating data specific to a first application from a second application that share the same user account, the data being native to a central repository of application settings for applications sharing the same user account, the method comprising:

loading the data native to the central repository of application settings, upon receiving a request for the data from the first application, from the central repository of application settings for applications sharing the same user account to a location specified by an access path;

creating a handle to the data native to the central repository of application settings, at the location specified by the access path;

passing the handle to the first application;

determining whether the data native to the central repository of application settings is designated as application-specific data for the first application that is inaccessible to other applications;

when it is determined that the data native to the central repository of application settings is designated as application-specific data for the first application, preventing creation of handles to the data other than the handle passed to the first application and denying one or more access requests that do not use the handle, from the second application sharing the same user account as the first application, for the data native to the central repository of application settings for applications sharing the same user account because the second application does not possess the handle, and;

when it is determined the data native to the central repository of application settings is not designated as application-specific data for the first application, allowing the one or more access requests for the data native to the central repository of application settings from the second application.

2. The method of claim 1, wherein the loading includes:
creating a unique identifier for the data native to the central repository of application settings;
generating the access path for the data native to the central repository of application settings, using the unique identifier; and
loading the data native to the central repository of application settings to the location specified by the access path.

3. The method of claim 1, further comprising:
creating a counter for the data native to the central repository of application settings after loading the data native to the central repository of application settings, wherein a value of the counter is initialized to zero;
incrementing the value of the counter when the handle is created for the data native to the central repository of application settings; and
decrementing the value of the counter when the handle is terminated.

4. The method of claim 3, further comprising:
unloading the data native to the central repository of application settings when the value of the counter reaches zero.

5. The method of claim 1, wherein the computing system includes an operating system registry, and wherein the data are one or more hives of the registry.

6. At least one computer-readable memory device encoded with a plurality of computer-executable instructions that, when executed, perform a method for providing application-specific data access in an environment where multiple applications share a same user account, the method comprising:
receiving an access request from a first computing process for data native to a central repository of application settings for applications sharing the same user account;
based at least on information received with the access request, determining whether access to the data native to the central repository of application settings should be limited to the first computing process including at least determining whether the first computing process has exclusive access to the data as application-specific data that is inaccessible to other processes; and
when it is determined that access should be limited, creating a handle through which the first computing process can exclusively access the data and denying access to the data native to the central repository of application settings to any other computing process sharing the same user account as the first computing process that does not possess the handle, such that the data native to the central repository of application settings for applications sharing the same user account can only be accessed by the first computing process through the handle; and
when it is determined that access should not be limited, allowing multiple computing processes to share access to the data native to the central repository of application settings.

7. The at least one computer-readable memory device of claim 6, wherein the information received with the access request comprises a configurable function parameter indicating whether access to the data native to the central repository of application settings should be limited to the first computing process.

8. The at least one computer-readable memory device of claim 6, wherein the method further comprises:
creating a unique identifier for the data native to the central repository of application settings;
generating a path using the unique identifier; and
loading the data native to the central repository of application settings to a location indicated by the path.

9. The at least one computer-readable memory device of claim 8, wherein the method further comprises returning to the first computing process the handle to the data native to the central repository of application settings.

10. The at least one computer-readable memory device of claim 9, wherein the method further comprises:
closing the handle when the first computing process finishes using the handle; and
unloading the data native to the central repository of application settings when no handle is associated with the data native to the central repository of application settings.

11. A computer-implemented method for isolating data specific to a first application from other applications sharing a same user account with the first application, the data native to a central repository of application settings for applications sharing the same user account, the method comprising:
upon receiving an access request from the first application for the data native to the central repository of application settings, loading the data native to the central repository of application settings from the central repository of application settings for applications sharing the same user account to a location specified by an access path;
creating a handle to the data native to the central repository of application settings, at the location specified by the access path;
passing the handle to the first application;
based at least on information received with the access request, determining whether the data native to the central repository of application settings is designated as inaccessible to applications other than the first application; and
when it is determined that the data native to the central repository of application settings is designated as inaccessible to applications other than the first application, preventing creation of handles to the data other than the handle passed to the first application and denying any access request, from the other applications sharing the same user account with the first application that does not possess the handle, for the data native to the central repository of application settings for applications sharing the same user account because the access requests do not use the handle and;
when it is determined that the data native to the central repository of application settings is not designated as inaccessible to applications other than the first application, enabling creation of additional handles to the data other than the handle passed to the first application and allowing access requests to the data native to the central repository of application settings from the other applications through respective handles.

12. The computer-implemented method of claim 11, wherein the loading includes:
generating a unique identifier for the data native to the central repository of application settings;
generating the access path for the data native to the central repository of application settings using the unique identifier; and
loading the data native to the central repository of application settings to the location specified by the access path.

13. The computer-implemented method of claim 11, further comprising:
upon loading the data native to the central repository of application settings, creating a counter for the data native to the central repository of application settings, wherein a value of the counter is initialized to zero;

incrementing the value of the counter whenever a handle is created for the data native to the central repository of application settings; and decrementing the value of the counter whenever the handle is terminated.

14. The computer-implemented method of claim 13, further comprising:

unloading the data native to the central repository of application settings when the value of the counter reaches zero.

* * * * *